Feb. 23, 1937.   R. F. DICKSON   2,071,921
LAMINATED STRUCTURE
Filed June 18, 1935

Robert F. Dickson INVENTOR.

BY

ATTORNEY.

Patented Feb. 23, 1937

2,071,921

UNITED STATES PATENT OFFICE 2,071,921

LAMINATED STRUCTURE

Robert F. Dickson, Leominster, Mass., assignor, by mesne assignments, to E. I. du Pont de Nemours & Company, Wilmington, Del., a corporation of Delaware Application June 18, 1935, Serial No. 27,172

7 Claims. (Cl. 154—2)

This invention relates to a laminated structure and, more particularly, to a decorative laminated sheet of cellulosic derivative plastic material. Heretofore, several methods of producing designs in sheets of plastic material have been known. However, there has been no satisfactory and economical method of producing clear cut designs with a uniform and definite repetition over the surface of a sheet of plastic. This has been attempted by printing on the surface of one sheet of cellulosic derivative plastic, or the like, and compositing the sheet with a transparent plastic sheet but this has not been satisfactory due to the tendency to destroy the highly desirable sharp cut line of the design during lamination of the two sheets; the blurring of the design apparently is caused either by flow of the sheet stock itself or by the action of the solvent used in compositing on the printing ink.

An object of the present invention is to provide a means of producing a sheet of plastic material having a clear cut design uniformly repeated all over its surface. A further object is to provide a simple and economically feasible method of obtaining this result. Other objects of the invention will be apparent from the description given hereinafter.

The above objects are accomplished according to the present invention by perforating in a regular pattern a sheet of seasoned opaque cellulosic derivative plastic, or the like, superposing on one side of said sheet a sheet of transparent cellulosic derivative plastic, or the like, containing sufficient solvent to make it appreciably softer than the first sheet, compositing said sheets and cementing a second sheet of opaque cellulosic derivative plastic of contrasting color to the first opaque plastic, to the opposite side of the first sheet.

In order to more clearly understand the present invention, reference is made to the accompanying drawing wherein like reference numerals refer to like parts. In this drawing.

Figure 1:
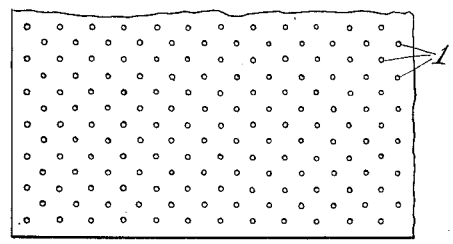
Fig. 1 is an elevation of a laminated sheet according to the present invention having a polka-dot design.
Figure 2:
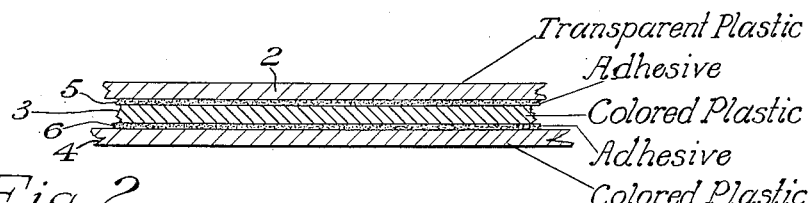
Fig. 2 is an enlarged section through the sheet shown in Fig. 1 on a line which does not pass through any of the polka dots.

Referring to Fig. 1, there is illustrated a decorative sheet of plastic having therein the regularly spaced polka dots 1. This sheet, according to the present invention and as shown more clearly in Fig. 2, is a laminated structure comprising a top sheet 2 of transparent plastic, an intermediate sheet 3 of colored plastic, and a lower sheet 4 of contrasting colored plastic with adhesive films 5 and 6 interposed between the respective sheets. It will be understood that in Figs. 2, 3, and 4 the construction is greatly magnified for purposes of illustration.

Figure 3:
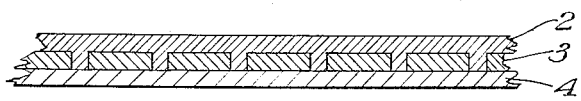
Fig. 3 is an enlarged section of the sheet shown in Fig. 1 on a line passing through a number of the polka dots.
Figure 4:
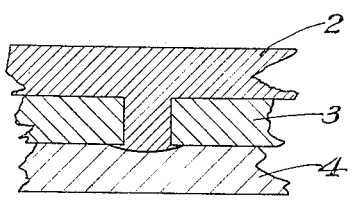
Fig. 4 is an enlarged section similar to Fig. 3 but showing in exaggerated detail the construction of the laminated sheet.

In Fig. 3, which is a section through the sheet illustrated in Fig. 1 along a line cutting through the polka dots, it will be seen that the sheet of transparent plastic 2 extends down into the perforations of the colored plastic sheet 3 whereas the sheet of contrasting colored plastic 4 forms a seal on the bottom side of the laminated structure. By employing the sheet of transparent plastic in a relatively soft condition as compared with the seasoned sheet of colored plastic 3 and using pressure and somewhat elevated temperature in compositing sheets 2 and 3, sheet 2 is not only forced down into the perforations in sheet 3, thereby completely filling them, but actually mushrooms out slightly on the opposite side of sheet 3 as is clearly illustrated in Fig. 4. When the sheet of colored plastic 4 is composited with sheets 2 and 3 the mushrooming effect of sheet 2 is covered up and hence is unnoticeable in the finished article.

The following example is given to illustrate one specific method of carrying out the present invention:—

*Example.*—A sheet of seasoned opaque cellulose nitrate plastic of blue color, said sheet being of standard commercial size, i. e., 20" x 50", and of .010" thickness, is perforated with regularly spaced small round openings of approximately $\frac{1}{16}$" in diameter arranged on $\frac{1}{8}$" centers to cover the area of the sheet. The sheet, being seasoned, contains very little volatile solvent, not in excess of 1.5% by weight.

A sheet of transparent cellulose nitrate plastic of .030" thickness of neutral color and being relatively unseasoned, that is, containing over 5% volatile solvent by weight of the sheet, is then composited with the perforated blue sheet by coating adjacent surfaces of each sheet with a cement of the following composition:

| | Per cent by weight |
|---|---|
| Dibutyl phthalate | 30 |
| Acetone | 25 |
| Denatured alcohol | 45 | and then pressing the two sheets together between ordinary commercial polishing plates such as familiar to those in the art, at the ordinary temperature and pressure, namely, a temperature of about 125° C. and a pressure of 450 lbs./sq. in. Due to the fact that the transparent sheet is relatively soft and is heated somewhat by the press, as well as being under pressure, it flows into and to a small extent through the perforations of the blue sheet, thereby filling the holes of the sheet and mushrooming out slightly on the opposite side of the sheet. A sheet of seasoned white cellulose nitrate plastic is now composited to the opposite side of the blue sheet by means of an interposed adhesive film and subjecting the laminated structure to heat and pressure between press polishing plates as mentioned above. In this manner a laminated sheet is obtained which appears to be blue with white polka dots regularly spaced over the entire surface, it being understood that the white sheet forming the bottom of the laminated structure can be seen through the transparent sheet superposed over the blue sheet and filling the perforations therein. The white polka dots thus formed in the blue sheet are as sharp cut and perfect in regularity as the perforations made in the blue sheet.

It will be understood that the above example is merely illustrative and that the present invention is not only applicable to laminated structures made up from cellulose nitrate plastic sheets but also other types of plastic sheets, including cellulose acetate and cellulose ether plastic sheets among the cellulose derivative plastic compounds, and other plastic sheets having appropriate properties. While it is not essential that the intermediate perforated sheet be fully seasoned in carrying out the present invention, it is highly desirable and, in order to obtain good results, the transparent sheet to be superposed upon the perforated opaque sheet and composited therewith, should be softer than the perforated opaque sheet. This is most conveniently done by employing as the transparent sheet, a sheet of unseasoned or partially seasoned cellulose derivative plastic, the volatile solvent content of which, by weight of the sheet, ranges from 3% to 8%. The reason for this is that the transparent sheet must flow into and fill out the perforations in the perforated opaque sheet. This effect may be accomplished by other means, such as by differential heating of the two sheets, or the like, as will occur to those skilled in the art.

Those skilled in the art will readily appreciate that the term "plastic" as used throughout the specification refers to an organic plastic such as exemplified by the various cellulose derivative plastics, rather than such substances as metals which might be considered "plastic" in a very broad sense of the word, and yet which would have no application in the present invention.

The composition of the cement or adhesive given in the specific example is, of course, merely illustrative and any of the many cements used in compositing cellulose derivative sheets may be used for this purpose. As will be understood by those skilled in the art, these cements are generally of the type having a solvent or softening effect on the sheets being composited and the coating or film of cement is of no appreciable thickness rather than being cements of the type containing solids which deposit an adhesive film of substantial body on the sheets. In fact, under certain conditions, the adhesion of the sheets without the use of a cement may be accomplished, although this is not preferred.

The temperature and pressure employed in compositing the various sheets according to the present invention may be varied according to the well known practice of compositing plastic sheets in the art today. Normally a temperature of 122° C. to 131° C. and a pressure of 400 lbs./sq. in. to 500 lbs./sq. in. is employed. While the conventional press polishing plates and associated flat press, such as commonly used in the art, are preferred in compositing the plastic sheets, obviously the present invention is not restricted to any specific method of applying heat and pressure.

In the specific example the plastic sheets were selected to give a composite sheet comprising a blue field covered with white regularly spaced polka dots. Every variation in color combinations between the perforated opaque sheet and the solid opaque sheet may be used, although a contrast in color between the two sheets is necessary in order to obtain the most advantageous effects.

The term "perforation" is used throughout the specification and claims to mean any type of design, small or large, which has been punched or cut out of the plastic sheet. These perforations may not only be polka dots but any other suitable design such as stars, anchors, squares, Scottie dogs, or the like, or any combination of these designs.

Some consideration should be given to the thickness of the sheets in order to produce the best results according to the present invention. The bottom solid opaque sheet 4 in the drawing may be of any thickness desired and will be selected largely with a view to the use to which the composite sheet is to be put. Its thickness with respect to the other sheets is immaterial. The intermediate sheet 3 is preferably as thin as is consistent with a satisfactory punching or perforating operation and with being of sufficient opacity so as not to be altered in color by the base sheet unless such alteration is desired. In the specific example a thickness of .010" was given for the intermediate sheet and this has been found quite satisfactory. Obviously variations in this thickness are permissible. The transparent sheet should be relatively thicker than the intermediate sheet in order that it may flow into and fill up the perforations in the intermediate sheet and still give a flat top surface. Where the perforations are large in size or close together, the thickness of the transparent sheet is preferably increased due to the increase in amount of the sheet which must flow into and fill up the perforations in the intermediate sheet. A thickness of .030" for the transparent sheet, as illustrated in the specific example, is satisfactory but, as will be understood by those skilled in the art, the thickness may be varied considerably.

The present invention does not require any special variation in the normal proportion of plasticizer in the cellulose derivative sheets and this proportion will be regulated according to well known practice in the art. To get the optimum appearance in a laminated product according to this invention, it is desirable to use a transparent sheet of a "neutral" color. The term "neutral" will be understood by those skilled in the art to mean a sheet with a color approximating that of a natural cellulose nitrate plastic without the addition, or with but a small amount, of added coloring matter. The use of a neutral colored transparent sheet enables one to preserve the original color of the opaque sheet on which it is superposed. The use of a sheet of ordinary transparent material known to those in the art and which has a bluish cast, tends to alter the shade of the color of the sheet on which it is superposed, although in many cases this may not be objectionable.

The present invention provides a simple and economical method of obtaining plastic sheets in large sizes with perfectly clear cut designs therein and uniform repetition of the designs over the whole surface of the sheet. Furthermore, this may be accomplished according to the present invention without requiring any special apparatus not readily available to the art; also the carrying out of the present invention does not require skill beyond that of the ordinary labor employed in the plastics art.

As many apparently widely different embodiments of this invention may be made without departing from the spirit and scope thereof, it is to be understood that the invention is not limited to the specific embodiments thereof except as defined in the appended claims.

I claim:

1. An integral laminated structure comprising an intermediate sheet of opaque organic plastic provided with a plurality of regularly disposed perforations, a sheet of transparent organic plastic cemented to one side thereof and completely filling said perforations, and a sheet of opaque organic plastic of contrasting color to said first opaque organic plastic cemented to the opposite side of said intermediate sheet.

2. An integral laminated structure comprising an intermediate sheet of opaque cellulose nitrate plastic provided with a plurality of regularly disposed perforations, a sheet of transparent cellulose nitrate plastic cemented to one side thereof and completely filling said perforations, and a sheet of opaque cellulose nitrate plastic of contrasting color to said first opaque plastic cemented to the opposite side of said intermediate sheet.

3. Method of making an integral laminated structure comprising perforating a sheet of seasoned opaque organic plastic, superposing on one side of said sheet a sheet of transparent organic plastic containing sufficient solvent to make it appreciably softer than said first sheet, compositing said sheets by pressure at an elevated temperature whereby said sheet of transparent organic plastic flows into and completely fills the perforations in said sheet of opaque organic plastic, and compositing a second sheet of opaque organic plastic of contrasting color to said first opaque plastic, to the opposite side of said first sheet.

4. Method of making an integral laminated structure comprising perforating a sheet of seasoned opaque cellulose nitrate plastic, superposing on one side of said sheet a sheet of transparent cellulose nitrate plastic containing sufficient solvent to make it appreciably softer than said first sheet, compositing said sheets by pressure at an elevated temperature whereby said sheet of transparent cellulose nitrate plastic flows into and completely fills the perforations in said sheet of opaque cellulose nitrate plastic, and compositing a second sheet of opaque cellulose nitrate plastic of contrasting color to said first opaque cellulose nitrate plastic, to the opposite side of said first sheet.

5. Method of making an integral laminated structure comprising perforating in a regular pattern a sheet of seasoned opaque organic plastic, superposing on one side of said sheet, with a film of cement interposed, a sheet of transparent cellulose nitrate plastic containing sufficient solvent to make it appreciably softer than said first sheet, compositing said sheets between press polishing plates whereby the sheet of transparent plastic flows into and completely fills the perforations in said sheet of opaque plastic, and compositing a second sheet of opaque cellulose nitrate plastic of contrasting color to said first opaque plastic, to the opposite side of said first sheet.

6. An integral laminated structure comprising an intermediate sheet of opaque cellulose derivative plastic provided with a plurality of regularly disposed perforations, a sheet of transparent cellulose derivative plastic cemented to one side thereof and completely filling said perforations, and a sheet of opaque cellulose derivative plastic of contrasting color to said first opaque plastic cemented to the opposite side of said intermediate sheet.

7. Method of making an integral laminated structure comprising perforating a sheet of seasoned opaque cellulose derivative plastic, superposing on one side of said sheet a sheet of transparent cellulose derivative plastic containing sufficient solvent to make it appreciably softer than said first sheet, compositing said sheets by pressure at an elevated temperature whereby said sheet of transparent plastic flows into and completely fills the perforations in said sheet of opaque plastic, and compositing a second sheet of opaque cellulose derivative plastic of contrasting color to said first opaque plastic, to the opposite side of said first sheet.

ROBERT F. DICKSON.